(12) United States Patent
Chue et al.

(10) Patent No.: US 6,848,016 B2
(45) Date of Patent: Jan. 25, 2005

(54) SYSTEM AND METHOD FOR EFFICIENTLY IMPLEMENTING AN ELECTRONIC DEVICE ARCHITECTURE

(75) Inventors: Harry Chue, Alameda, CA (US); Garry Kak Tsang, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 501 days.

(21) Appl. No.: 09/899,436

(22) Filed: Jul. 5, 2001

(65) Prior Publication Data

US 2002/0073265 A1 Jun. 13, 2002

Related U.S. Application Data

(60) Provisional application No. 60/254,158, filed on Dec. 7, 2000.

(51) Int. Cl.[7] .............................................. G06F 13/00
(52) U.S. Cl. ........................................ 710/313; 710/22
(58) Field of Search ................................ 710/303, 304, 710/305, 306, 313, 22, 23, 27

(56) References Cited

U.S. PATENT DOCUMENTS

| | | | |
|---|---|---|---|
| 5,475,818 A | * 12/1995 | Molyneaux et al. | 710/315 |
| 5,625,829 A | * 4/1997 | Gephardt et al. | 710/104 |
| 5,838,930 A | * 11/1998 | Harashima | 710/107 |
| 5,991,839 A | * 11/1999 | Ninomiya | 710/303 |
| 6,006,319 A | * 12/1999 | Takahashi et al. | 712/34 |
| 6,145,029 A | * 11/2000 | Deschepper et al. | 710/36 |
| 6,599,194 B1 | * 7/2003 | Smith et al. | 463/30 |
| 6,606,678 B1 | * 8/2003 | Nakamura | 710/305 |

* cited by examiner

*Primary Examiner*—Glenn A. Auve
(74) *Attorney, Agent, or Firm*—Gregory J. Kôrner; Simon & Koerner LLP (57) ABSTRACT

A system and method for efficiently implementing an electronic device architecture preferably includes a primary device that is configured to perform core operating functions in the electronic architecture, an auxiliary device that is configured to perform selected additional operating functions in the electronic architecture, a primary channel configured for performing communications procedures between the primary device and the auxiliary device, and an auxiliary channel configured for performing data transfer operations between the primary device and the auxiliary device. The communications procedures over the primary channel and the data transfer operations over the auxiliary channel may preferably occur in a concurrent manner.

42 Claims, 8 Drawing Sheets

SYSTEM AND METHOD FOR EFFICIENTLY IMPLEMENTING AN ELECTRONIC DEVICE ARCHITECTURE

CROSS-REFERENCE TO RELATED APPLICATIONS

This application relates to, and claims priority in, U.S. Provisional Patent Application Ser. No. 60/254,158, entitled "Bus Auxiliary Channel (BAC) Providing DMA Capabilities For Concurrent I/O Accesses" filed on Dec. 7, 2000. The related application is commonly assigned, and is hereby incorporated by reference.

BACKGROUND SECTION

1. Field of the Invention

This invention relates generally to techniques for designing electronic systems, and relates more particularly to a system and method for efficiently implementing an electronic device architecture.

2. Description of the Background Art

Utilizing efficient methods to implement electronic systems is a significant consideration for designers and manufacturers of contemporary electronic devices. However, efficiently implementing electronic systems may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that transfers digital image data may benefit from an effective implementation because of the large amount and complexity of the digital data involved.

In certain contemporary environments, complex or lengthy operations may often consume substantial amounts of available system resources to the detriment of other system functionalities. For example, a system central processing unit may be diverted from other important tasks if frequently required to coordinate and control one or more data transfer operations of significant complexity or length.

Due to growing demands on system resources and substantially increasing data magnitudes, it is apparent that developing new techniques for implementing electronic systems is a matter of concern for related electronic technologies. Therefore, for all the foregoing reasons, developing efficient techniques for implementing electronic systems remains a significant consideration for designers, manufacturers, and users of contemporary electronic devices.

SUMMARY

In accordance with the present invention, a system and method are disclosed for efficiently implementing an electronic device architecture. In one embodiment, an electronic system may preferably include, but is not limited to, a central processing unit (CPU), a primary device, a memory, one or more primary peripheral devices, an auxiliary device, and one or more auxiliary peripheral devices. In accordance with the present invention, the primary device may preferably communicate with the auxiliary device via either a primary channel or an auxiliary channel.

During utilization of the primary channel, the CPU may initially determine whether the performance of an auxiliary configuration operation to configure or setup the auxiliary device is required. The CPU may preferably utilize any effective technique to make the foregoing determination. For example, the auxiliary device may provide notification, or alternately, the CPU may poll the auxiliary device. If such an auxiliary configuration operation is required in electronic system, then the CPU may preferably utilize an arbiter to arbitrate for access to the primary channel.

After gaining access to the primary channel, then the CPU may preferably program auxiliary configuration registers to effectively setup the auxiliary device. In accordance with the present invention, the CPU may perform an auxiliary configuration operation at powerup, or may dynamically perform an auxiliary configuration operation in response to various operating conditions in the electronic system.

In accordance with the present invention, the CPU may also preferably determine whether performance of an auxiliary communication procedure between the auxiliary device and the primary device is required. The CPU may utilize any effective technique to make the foregoing determination. For example, the auxiliary device or another entity may provide notification, or alternately, the CPU may poll the auxiliary device or other entities. When such an auxiliary communication procedure is required in the electronic system, then the CPU may preferably utilize the arbiter to arbitrate for access to the primary channel.

After gaining access to the primary channel, then the CPU or any other appropriate entity may preferably perform the foregoing auxiliary communication procedure between the auxiliary device and the primary device. In accordance with the present invention, such auxiliary communication procedures may readily include bi-directional communications.

In accordance with the present invention, during utilization of the foregoing auxiliary channel, the CPU may preferably monitor the electronic system until performance of a data transfer operation between the auxiliary device and the memory is required. The CPU may utilize any effective technique to make the foregoing determination. For example, the auxiliary device or another entity may provide notification, or alternately, the CPU may poll the auxiliary device or other appropriate entities. When such a data transfer operation is required in the electronic system, then the CPU may preferably setup a DMA engine to control the foregoing data transfer operation. In certain embodiments, the CPU may preferably program various registers coupled to the DMA engine to provide relevant information regarding the required data transfer operation.

Next, the CPU may preferably instruct the DMA engine to initiate the required data transfer operation. The DMA engine may then preferably begin the required data transfer operation between the auxiliary device and the memory via the auxiliary channel. When the DMA engine determines that the current data transfer operation is complete, then the DMA engine may preferably notify the CPU regarding the completion of the required data transfer operation. In accordance with the present invention, the foregoing data transfer procedure via the auxiliary channel may readily occur concurrently with the foregoing communication procedure via the primary channel. The present invention thus provides an improved system and method for efficiently implementing an electronic device architecture.

DETAILED DESCRIPTION

The present invention relates to an improvement in architectures of electronic devices. The following description is presented to enable one of ordinary skill in the art to make and use the invention and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for efficiently implementing an electronic device architecture, and preferably includes a primary device that is configured to perform core operating functions in the electronic architecture, an auxiliary device that is configured to perform selected additional operating functions in the electronic architecture, a primary channel configured for performing communications procedures between the primary device and the auxiliary device, and an auxiliary channel configured for performing data transfer operations between the primary device and the auxiliary device. In accordance with the present invention, the communications procedures over the primary channel and the data transfer operations over the auxiliary channel may preferably occur in a concurrent manner.

Figure 1:
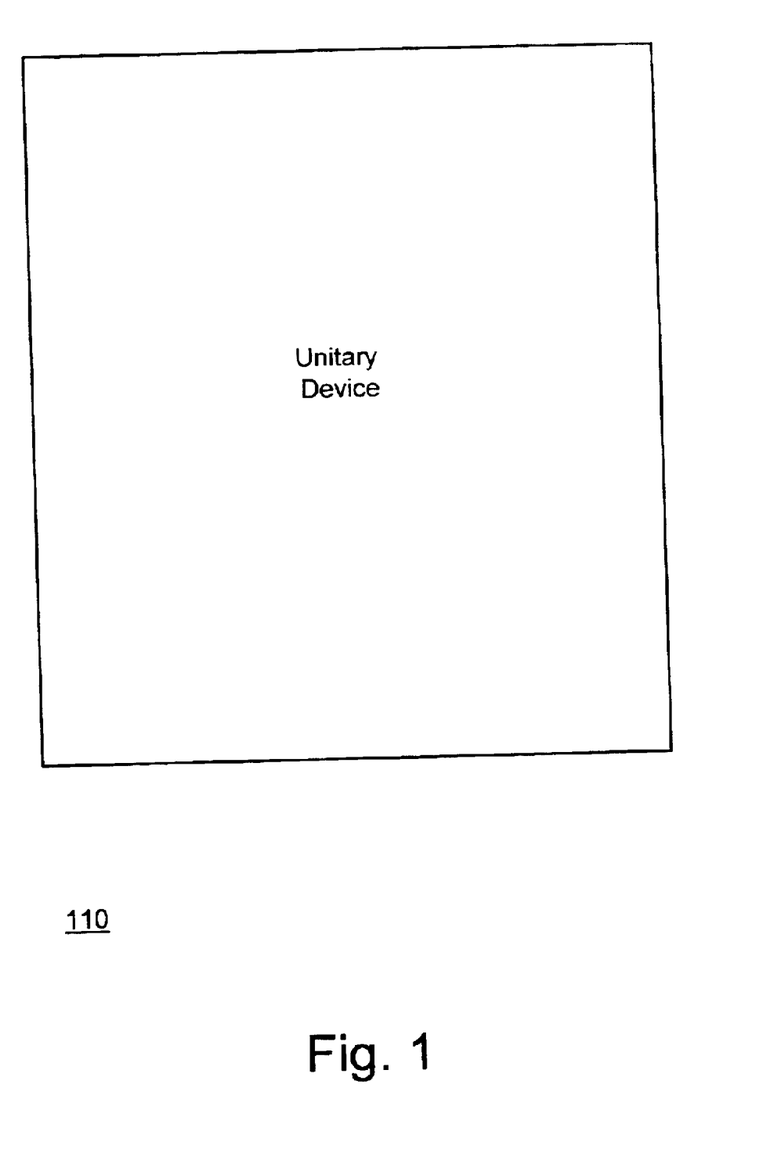
FIG. 1 is a block diagram that illustrates one embodiment of a unitary device.

Referring now to FIG. 1, a block diagram that illustrates one embodiment of a unitary device 110 is shown. In the FIG. 1 embodiment, unitary device 110 may be implemented in any desired manner. For example, unitary device 110 may be implemented as an integrated circuit device for utilization in a more extensive electronic system.

Designers of electronic devices typically design electronic devices such as unitary device 110 to perform one or more specific tasks or operations. After designing and manufacturing unitary device 110, the performance of various additional or different tasks may subsequently be required by system users. These new requirements may require an inefficient and economically detrimental redesigning and remanufacturing of unitary device 110.

In addition, electronic devices such as unitary device 110 typically include a plurality of external electrical connectors to allow unitary device 110 to communicate with various external entities. For example, integrated circuits typically have a series of electrical connectors that are commonly referred to as "pins" for communicating with other electronic devices. An implementation with an insufficient number of available pins may have adverse effects upon various operating parameters of unitary device 110. For example, an insufficient number of available pins may negatively effect the operational bandwidth of unitary device 110. Appropriate solutions for the foregoing issues are further discussed below in conjunction with FIGS. 2 through 8.

Figure 2:
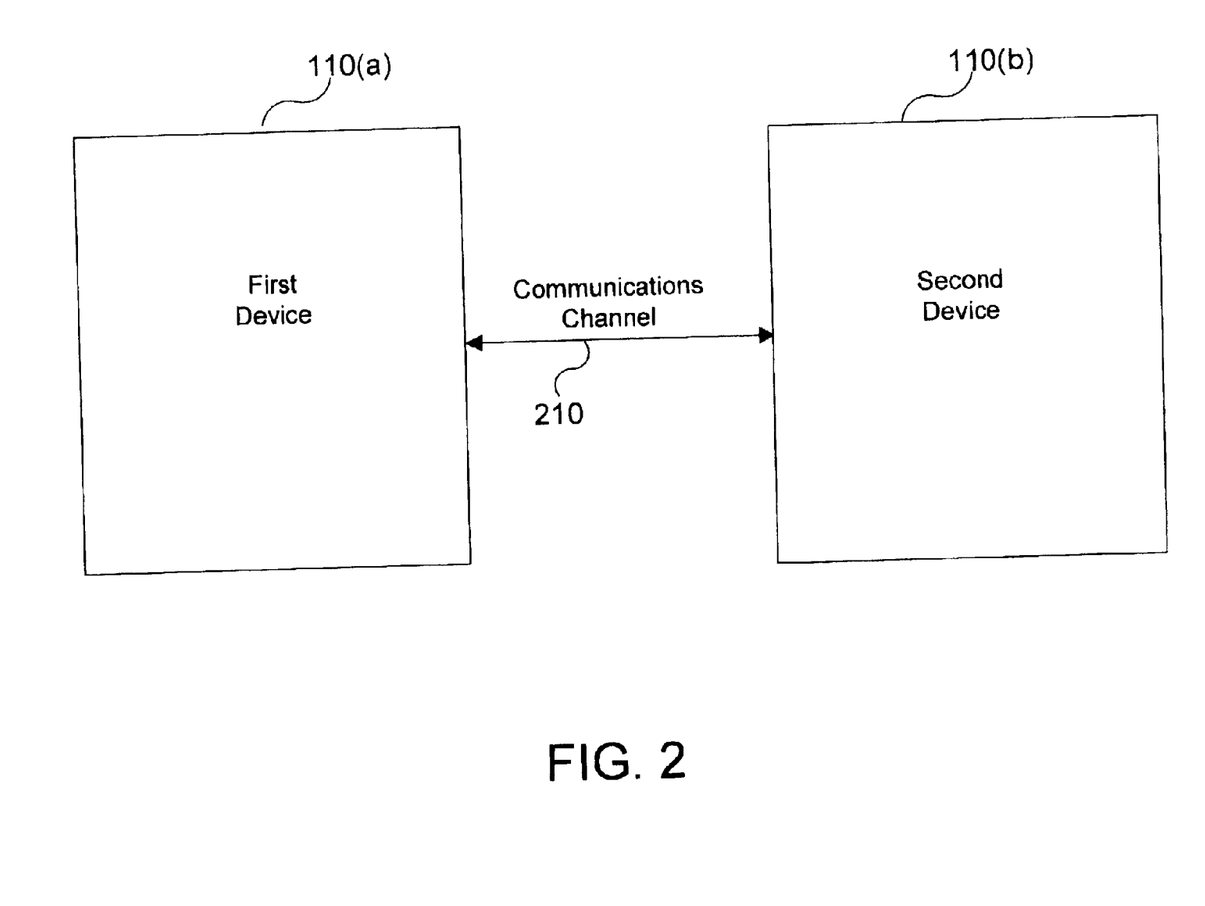
FIG. 2 is a block diagram of a first device and a second device coupled by a communications channel, in accordance with one embodiment of the present invention.

Referring now to FIG. 2, a block diagram of a first device 110(a) and a second device 110(b) coupled by a communications channel 210 is shown, in accordance with one embodiment of the present invention. In the FIG. 2 embodiment, first device 110(a) and second device 110(b) may be implemented in any desired manner. For example, first device 110(a) and second device 110(b) may be implemented as integrated circuit devices for utilization in a more extensive electronic system.

In the FIG. 2 embodiment, the problems discussed above in conjunction with the FIG. 1 unitary device 110 may preferably be addressed by advantageously separating various functionalities of unitary device 110 (FIG. 1) for performance by either first device 110(a) or second device 110(b). In the FIG. 2 embodiment, first device 110(a) may then include relatively unchanging elements and functionalities, while second device 110(b) may be utilized to support less standard, changeable elements and functionalities. System designers may thus efficiently redesign only second device 110(b) to subsequently support any additional or different tasks or operations. The foregoing architecture may also be advantageously utilized while initially designing an electronic system. The FIG. 2 embodiment also provide a substantially increased pin count or number of available electrical connectors to thereby more efficiently implement a given electronic system.

In the FIG. 2 embodiment, first device 110(a) and second device 110(b) may communicate through a single communications channel 210. In certain environments and applications, the performance of a host electronic system may be adversely affected if a communication or a data transfer is immediately required between first device 110(a) and second device 110(b) while communications channel 210 is currently in use. For example, a lengthy data transfer may stall other important communications. Appropriate solutions for the foregoing issues are further discussed below in conjunction with FIGS. 3 through 8.

Figure 3:
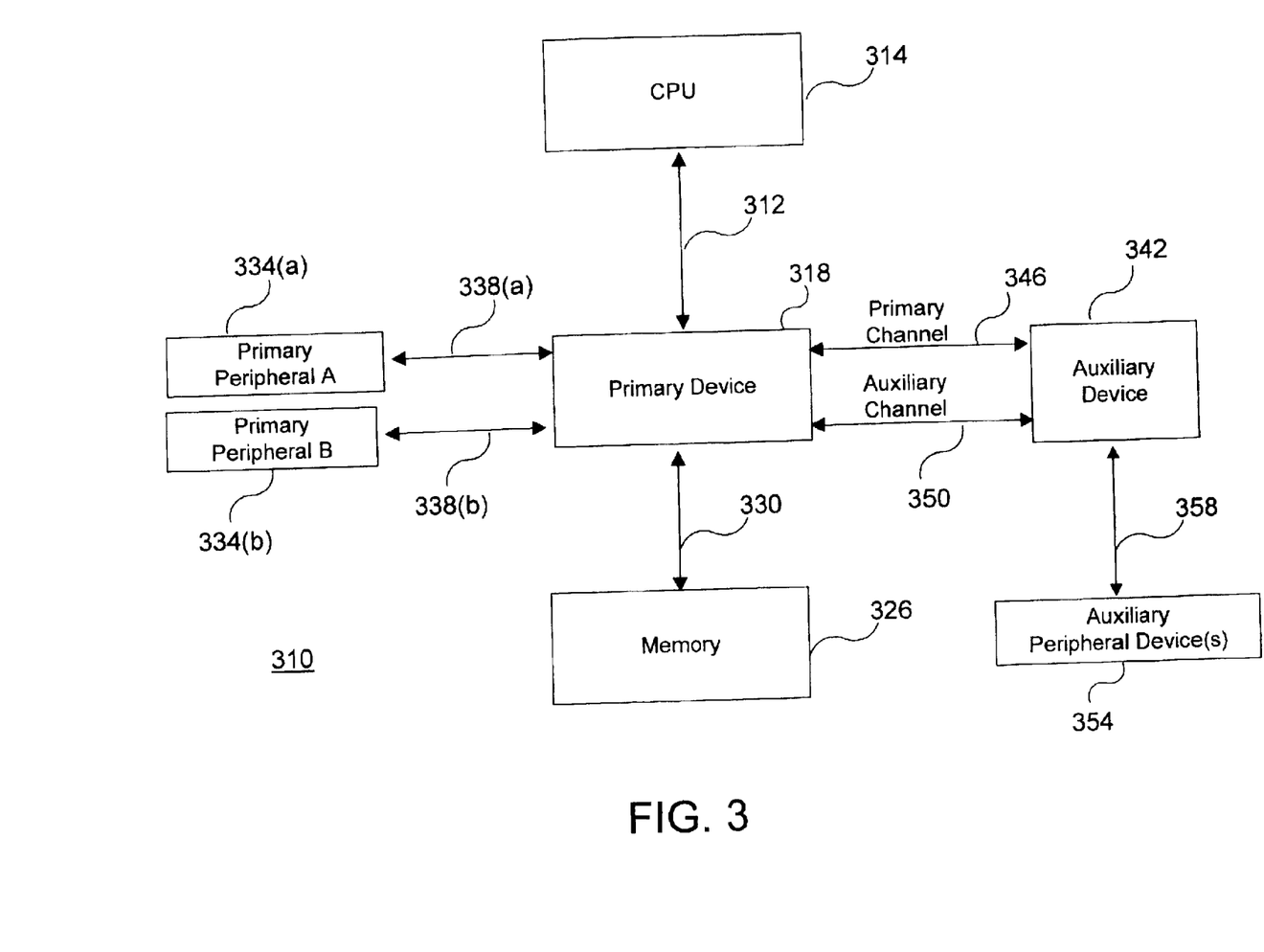
FIG. 3 is a block diagram for one embodiment of an electronic system, in accordance with the present invention.

Referring now to FIG. 3, a block diagram for one embodiment of an electronic system 310 is shown, in accordance with the present invention. In the FIG. 3 embodiment, electronic system 310 may preferably include, but is not limited to, a central processing unit (CPU) 314, a primary device 318, a memory 326, a primary peripheral A 334(a), a primary peripheral B 334(b), an auxiliary device 342, and one or more auxiliary devices 354. In accordance with the present invention, primary device 318 may preferably communicate with auxiliary device 342 via either a primary channel 346 or an auxiliary channel 350.

In alternate embodiments, electronic system 310 may readily include various other elements or functionalities in addition to, or instead of, those elements or functionalities discussed in conjunction with the FIG. 3 embodiment. Furthermore, electronic system 310 may be implemented and configured in any desired manner. For example, electronic system 310 may be implemented as various integrated circuit devices, as a audio/visual electronic device, as a consumer electronics device, as a portable electronic device, or as a computer device.

In the FIG. 3 embodiment, CPU 314 may preferably be implemented as any appropriate and effective processor device or microprocessor to thereby control and coordinate the operation of electronic system 310 in response to various software program instructions. In the FIG. 3 embodiment, primary device 318 may preferably communicate with CPU 314 via path 312, and may preferably include one or more interfaces for bidirectionally communicating with other devices or entities in electronic system 310.

As discussed above in conjunction with FIG. 2 and first device 110(a), primary device 318 may preferably be implemented to perform a core group of designated and relatively unchanging functions for electronic system 310. In the FIG. 3 embodiment, primary device 318 may preferably perform various input/output interface functions for electronic system 310. One embodiment of primary device 318 is further discussed below in conjunction with FIG. 4.

In the FIG. 3 embodiment, auxiliary device 342 may preferably communicate with primary device 318 via primary channel 346 and auxiliary channel 350. Auxiliary device 342 may preferably include one or more interfaces for bidirectionally communicating with other devices or entities in electronic system 310, and may essentially serve as an expansion device of primary device 318. As discussed above in conjunction with FIG. 2 and second device 110(b), auxiliary device 342 may be flexibly implemented to perform a secondary group of designated and supplementary changeable functions for electronic system 310. In the FIG. 3 embodiment, auxiliary device 342 may preferably perform various input/output interface functions for electronic system 310. One embodiment of auxiliary device 342 is further discussed below in conjunction with FIG. 5.

In the FIG. 3 embodiment, electronic system 310 may preferably utilize primary channel 346 to perform any desired types of communications between primary device 318 and auxiliary device 342. For example, in certain embodiments, primary channel 346 may preferably be utilized to transfer basic operational communications and other information between CPU 314 and auxiliary device 342. In accordance with the present invention, in certain embodiments, the operation of auxiliary device 342 and primary channel 346 may be substantially transparent to CPU 314.

In the FIG. 3 embodiment, electronic system 310 may preferably utilize auxiliary channel 350 to transfer any desired type of information between primary device 318 and auxiliary device 342. For example, in certain embodiments, auxiliary channel 350 may preferably be utilized to transfer various types of data and other information between auxiliary device 342 and memory 326 via primary device 318. In other embodiments, auxiliary channel 350 may preferably be utilized to transfer any desired type of information between auxiliary device 342 and any entity coupled to electronic system 310. In accordance with the present invention, in certain embodiments, the operation of auxiliary device 342 and auxiliary channel 350 may be transparent to CPU 314.

In the FIG. 3 embodiment, memory 326 may bidirectionally communicate with primary device 318 via path 330. Memory 326 may be implemented by utilizing any desired technologies or configurations. One implementation and configuration for memory 326 is further discussed below in conjunction with FIG. 6.

In accordance with the present invention, primary device 318 may also bidirectionally communicate with various primary peripheral devices 334 in electronic system 310. In the FIG. 3 embodiment, primary device 318 may preferably communicate with a primary peripheral A 334(a) via path 338(a), and may also preferably communicate with a primary peripheral B 334(b) via path 338(b). In alternate embodiments, primary device 318 may readily communicate with any desired number of primary peripheral devices in addition to, or instead of, those primary peripheral devices 334 that are presented and discussed in conjunction with the FIG. 3 embodiment. Similarly, in the FIG. 3 embodiment, auxiliary device 342 may preferably communicate with one or more auxiliary peripheral devices 354 via path 358.

Figure 4:
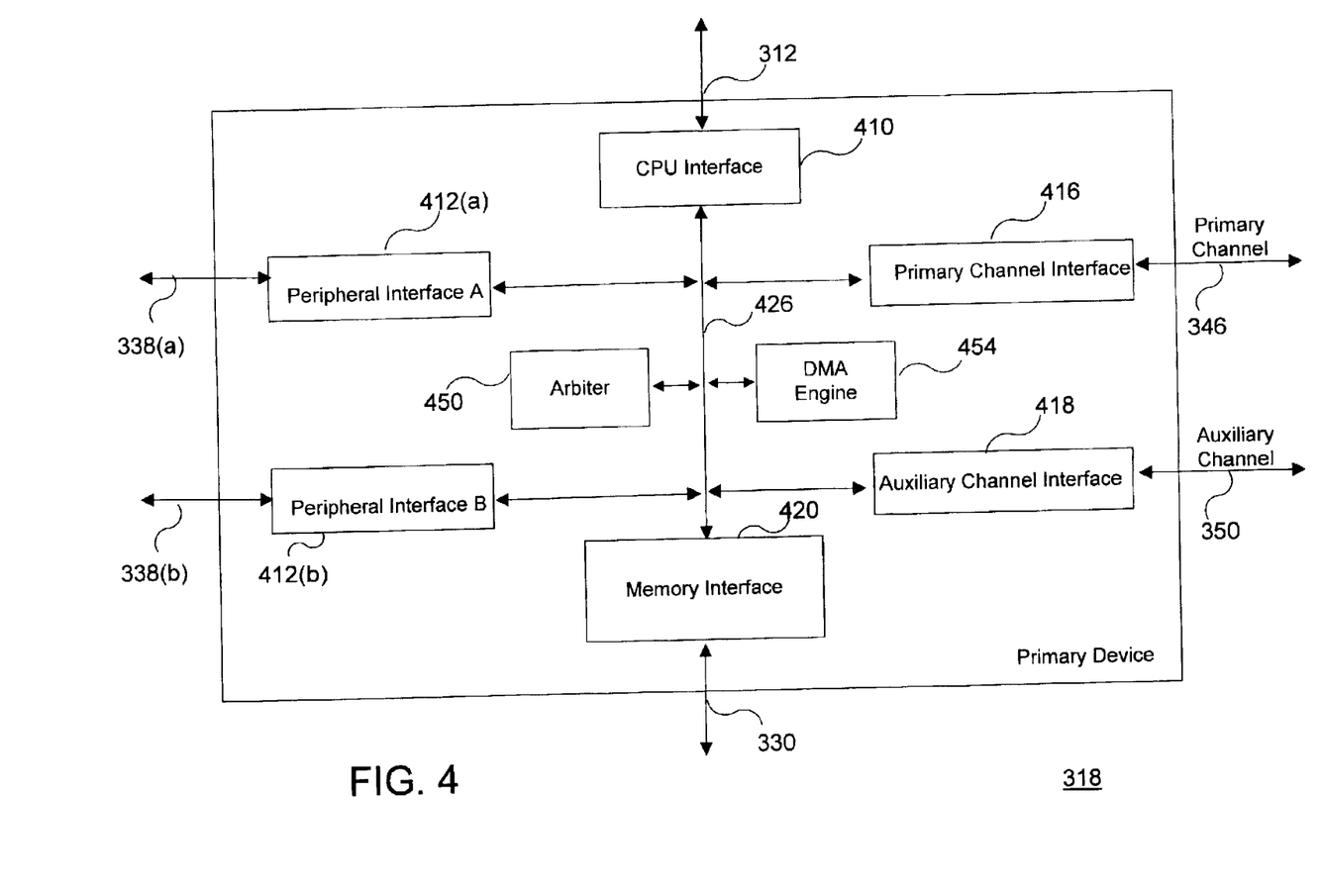
FIG. 4 is a block diagram for one embodiment of the primary device of FIG. 3, in accordance with the present invention.

Referring now to FIG. 4, a block diagram for one embodiment of the FIG. 3 primary device 318 is shown, in accordance with the present invention. In the FIG. 4 embodiment, primary device 318 may preferably include, but is not limited to, a CPU interface 410, a peripheral interface A 412(a), a peripheral interface B 412(b), a DMA engine 454, an arbiter 450, a memory interface 420, a primary channel interface 416, and an auxiliary channel interface 418.

In alternate embodiments, primary device 318 may readily include various other elements or functionalities in addition to, or instead of, those elements or functionalities discussed in conjunction with the FIG. 4 embodiment. In addition, primary device 318 may be implemented in any appropriate manner. For example, in certain embodiments, primary device 318 may be implemented as a separate integrated circuit device in electronic system 310.

In the FIG. 4 embodiment, CPU 314 may communicate with primary device 318 through a CPU interface 410. Similarly, memory 326 may communicate with primary device 318 through a memory interface 420. In addition, primary peripheral A 334(a) may communicate with primary device 318 through a peripheral interface A 412(a), and primary peripheral B 334(b) may communicate with primary device 318 through a peripheral interface B 412(b). Primary device 318 may preferably also include a primary bus 426 to enable various components and devices in electronic system 110 to effectively communicate through primary device 318.

In the FIG. 4 embodiment, primary device 318 may preferably communicate with auxiliary device 342 across primary channel 346 via a primary channel interface 416. Similarly, primary device 318 may preferably communicate with auxiliary device 342 across auxiliary channel 350 via an auxiliary channel interface 418. In the FIG. 4 embodiment, in order to conserve the number of electrical connectors or pins used to communicate over primary channel 346, primary device 318 may preferably multiplex communications of multiple devices by utilizing the same pins. For example, CPU 314, primary peripheral A 334(a), and primary peripheral B 334(b) may each communicate with auxiliary device 342 through primary channel interface by using the same pins.

In accordance with the present invention, arbiter 450 may therefore preferably perform a primary channel arbitration procedure for granting control of primary channel 346 to any appropriate entity coupled to primary device 318. Arbiter 450 may perform the primary channel arbitration procedure using any effective technique or method. For example, a pre-determined priority scheme may be utilized, or a round-robin system may be used in which priority alternates on an equal basis among interested entities or devices.

In the FIG. 4 embodiment, DMA engine 454 may be utilized to perform a direct memory access (DMA) data transfer between memory 326 and any appropriate entity coupled to primary device 318. For example, DMA engine 454 may coordinate a data transfer between auxiliary device 342 and memory 326 via auxiliary channel 350, auxiliary channel interface 418, and memory interface 420. The functionality and operation of primary device 318 is further discussed below in conjunction with FIGS. 5 through 8.

Figure 5:
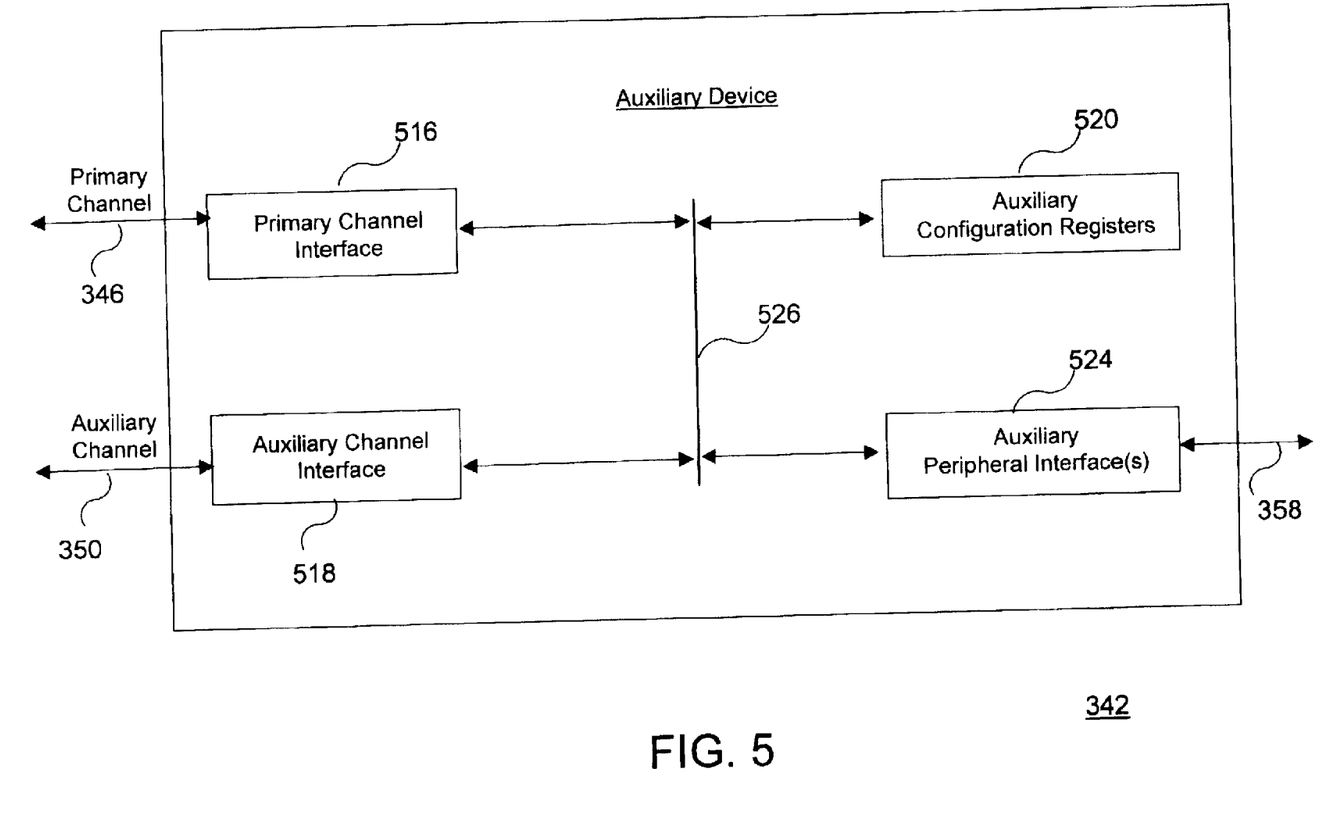
FIG. 5 is a block diagram for one embodiment of the auxiliary device of FIG. 3, in accordance with the present invention.

Referring now to FIG. 5, a block diagram for one embodiment of the FIG. 3 auxiliary device 342 is shown, in accordance with the present invention. In the FIG. 5 embodiment, auxiliary device 342 may preferably include, but is not limited to, a primary channel interface 516, an auxiliary channel interface 518, auxiliary configuration registers 520, and one or more auxiliary peripheral interfaces 524. Auxiliary device 342 may preferably also include an auxiliary bus 526 to enable various components and devices in electronic system 110 to effectively communicate through auxiliary device 342.

In alternate embodiments, auxiliary device 342 may readily include various other elements or functionalities in addition to, or instead of, those elements or functionalities discussed in conjunction with the FIG. 5 embodiment. In addition, auxiliary device 342 may be implemented in any appropriate manner. For example, in certain embodiments, auxiliary device 342 may preferably be implemented as a separate integrated circuit device in electronic system 310.

In the FIG. 5 embodiment, auxiliary device 342 may preferably communicate with primary device 318 across primary channel 346 via a primary channel interface 516. Similarly, auxiliary device 342 may preferably communicate with primary device 318 across auxiliary channel 350 via an auxiliary channel interface 518. In addition, auxiliary device 342 may communicate with one or more auxiliary peripheral devices 354 via auxiliary peripheral interfaces 524 and path 358.

In the FIG. 5 embodiment, auxiliary configuration registers 520 may be programmed by any appropriate entity, such as CPU 314, to perform an auxiliary device configuration procedure to thereby setup auxiliary device 342 for one or more particular functions. In certain embodiments, an auxiliary DMA engine (not shown) may be utilized to coordinate a direct memory access (DMA) data transfer between memory 326 and auxiliary device 342 via auxiliary channel 350. The functionality and operation of auxiliary device 342 is further discussed below in conjunction with FIGS. 7 and 8.

Figure 6:
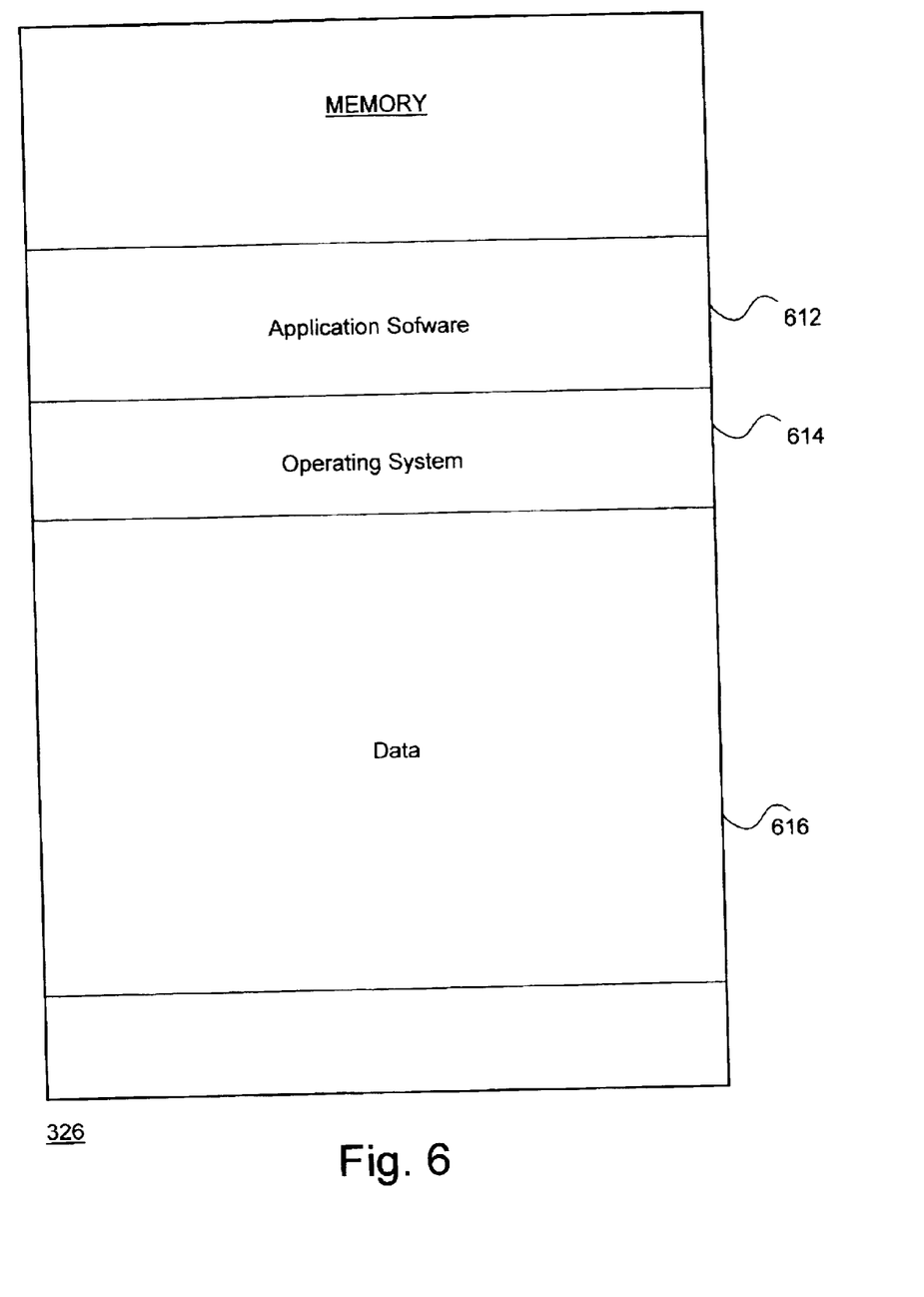
FIG. 6 is a block diagram for one embodiment of the memory of FIG. 3, in accordance with the present invention.

Referring now to FIG. 6, a block diagram for one embodiment of the FIG. 3 memory 326 is shown, in accordance with the present invention. In the FIG. 6 embodiment, memory 326 may preferably include, but is not limited to, application software 612, an operating system 614, and data 616. In alternate embodiments, memory 326 may readily include various other elements or functionalities in addition to, or instead of, those elements or functionalities discussed in conjunction with the FIG. 6 embodiment.

In the FIG. 6 embodiment, application software 612 may include program instructions that are preferably executed by CPU 314 (FIG. 3) to perform various functions and operations for electronic system 310. The particular nature and functionality of application software 612 preferably varies depending upon factors such as the specific type and particular use of the corresponding electronic system 310. In the FIG. 6 embodiment, operating system 614 preferably controls and coordinates low-level functionality of electronic system 310. In the FIG. 6 embodiment, data 616 may preferably include any desired type of information that is stored by memory 326 for use by electronic system 310. In certain embodiments, memory 326 may be implemented as a synchronous dynamic random access memory (SDRAM) or other similar memory device.

Figure 7:
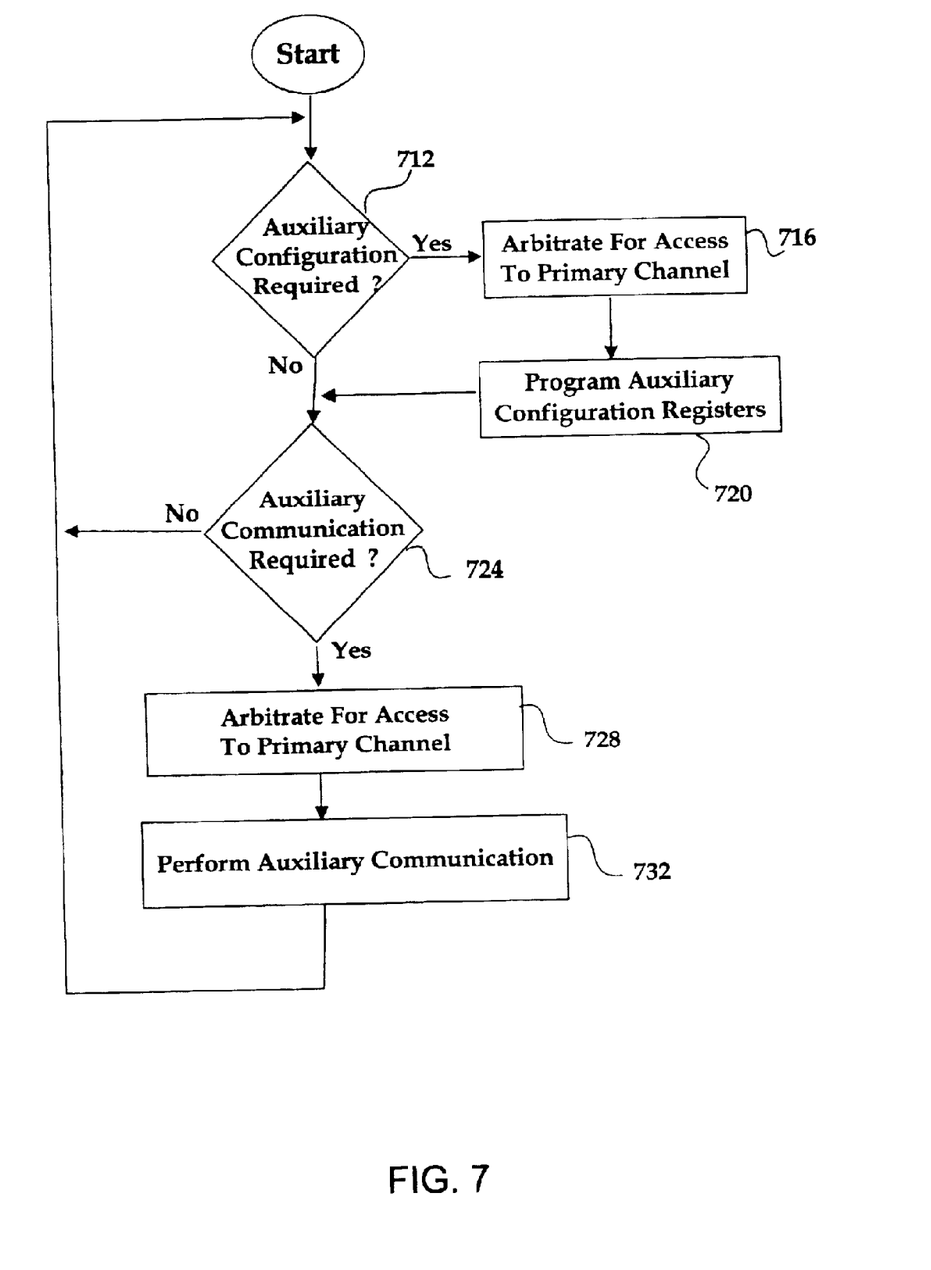
FIG. 7 is a flowchart of method steps for utilizing the primary channel of FIG. 3, in accordance with one embodiment of the present invention.

Referring now to FIG. 7, a flowchart of method steps for utilizing the FIG. 3 primary channel 346 is shown, in accordance with one embodiment of the present invention. The FIG. 7 embodiment is presented for purposes of illustration, and in alternate embodiments, the present invention may readily utilize various steps and sequences other than those discussed in conjunction with the FIG. 7 embodiment.

In the FIG. 7 embodiment, in step 712, CPU 314 may preferably determine whether the performance of an auxiliary configuration operation to configure auxiliary device 342 is required. CPU 314 may utilize any effective technique to make the foregoing determination. For example, auxiliary device 342 may provide notification, or alternately, CPU 314 may poll auxiliary device 342. If such an auxiliary configuration operation is required in electronic system 310, then in step 716, CPU 314 may preferably utilize arbiter 450 to arbitrate for access to primary channel 346.

After gaining access to primary channel 346, in step 720, CPU 314 may then preferably program auxiliary configuration registers 520 to effectively setup auxiliary device 342. In accordance with the present invention, CPU 314 may perform an auxiliary configuration operation at powerup, or may dynamically perform an auxiliary configuration operation in response to various operating conditions in electronic system 310. The FIG. 7 process may then advance to step 724.

In foregoing step 712, if an auxiliary configuration operation is not required in electronic system 310, then in step 724, CPU 314 may preferably determine whether the performance of an auxiliary communication procedure between auxiliary device 342 and primary device 318 is required. CPU 314 may utilize any effective technique to make the foregoing determination. For example, auxiliary device 342 or another entity may provide notification, or alternately, CPU 314 may poll auxiliary device 342 or other entities. When such an auxiliary communication procedure is required in electronic system 310, then in step 728, CPU 314 may preferably utilize arbiter 450 to arbitrate for access to primary channel 346.

After gaining access to primary channel 346, then in step 732, CPU 314 or any other appropriate entity may preferably perform the foregoing auxiliary communication procedure between auxiliary device 342 and primary device 318. In accordance with the present invention, such auxiliary communication procedures may readily include bi-directional communications. The FIG. 7 process may then preferably return to foregoing step 712 to perform any additional auxiliary configuration operations or auxiliary communication procedures. In accordance with the present invention, the FIG. 7 communication procedure via primary channel 346 may readily occur concurrently with the following FIG. 8 data transfer procedure via auxiliary channel 350. The present invention thus provides an improved system and method for efficiently implementing an electronic device architecture.

Figure 8:
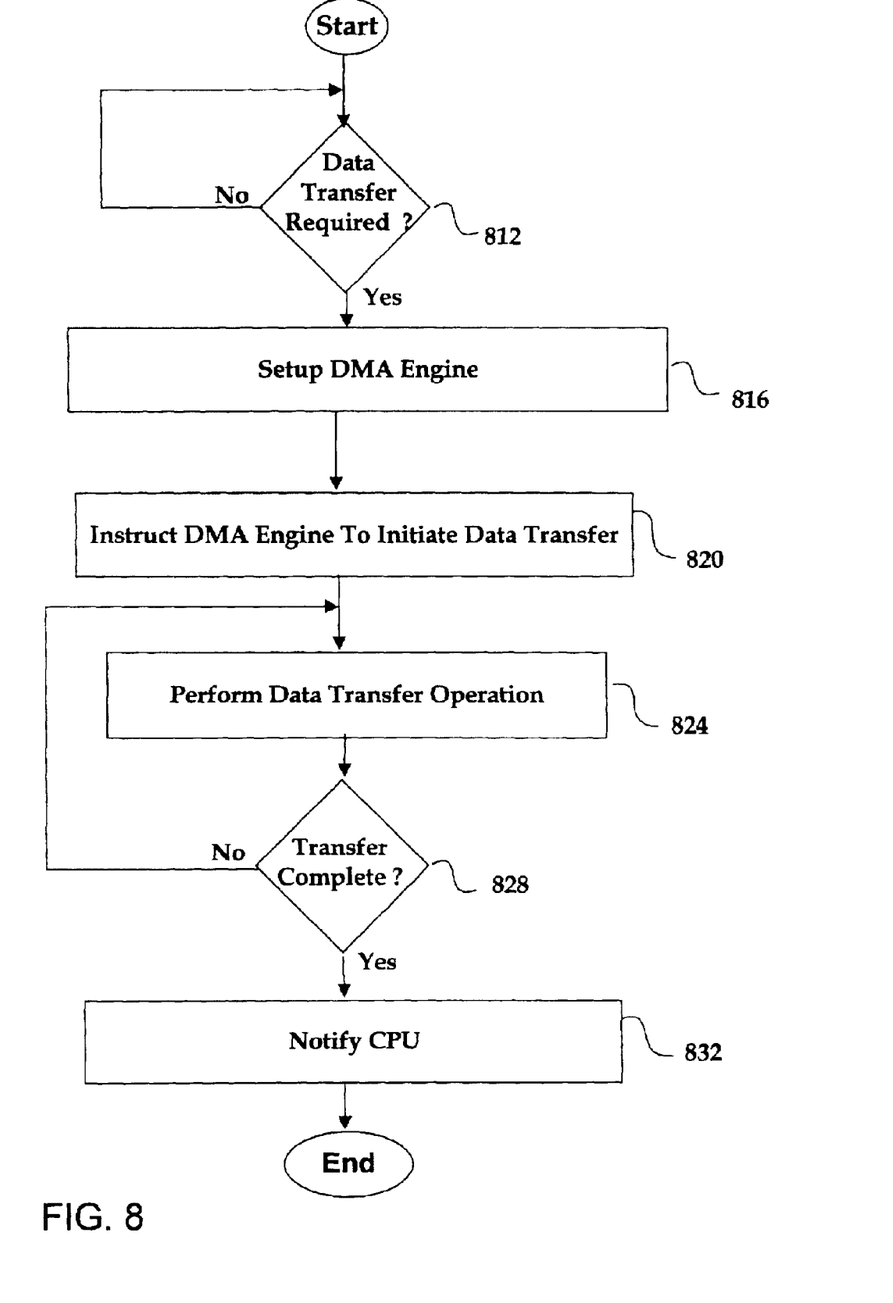
FIG. 8 is a flowchart of method steps for utilizing the auxiliary channel of FIG. 3, in accordance with one embodiment of the present invention.

Referring now to FIG. 8, a flowchart of method steps for utilizing the FIG. 3 auxiliary channel 350 is shown, in accordance with one embodiment of the present invention. The FIG. 8 embodiment is presented for purposes of illustration, and in alternate embodiments, the present invention may readily utilize various steps and sequences other than those discussed in conjunction with the FIG. 8 embodiment.

In the FIG. 8 embodiment, in step 812, CPU 314 may preferably monitor electronic system 310 until performance of a data transfer operation between auxiliary device 342 and memory 326 is required. CPU 314 may utilize any effective technique to make the foregoing determination. For example, auxiliary device 342 or another entity may provide notification, or alternately, CPU 314 may poll auxiliary device 342 or other entities. When such a data transfer operation is required in electronic system 310, then in step 816, CPU 314 may preferably setup DMA engine 454 to perform the foregoing data transfer operation. In certain embodiments, CPU 314 may preferably program various registers of DMA engine 454 to provide relevant information regarding the required data transfer operation.

Next, in step 820, CPU 314 may preferably instruct DMA engine 454 to initiate the required data transfer operation. In step 824, DMA engine 454 may then preferably begin the required data transfer operation from auxiliary device 342 to memory 326 via auxiliary channel 350. In step 828, DMA engine 454 may preferably determine whether the current data transfer operation is complete. If the current data transfer operation is not complete, then DMA engine 454 may preferably return to foregoing step 824, and continue to effectively perform the data transfer operation.

However, in step 828, if DMA engine 454 determines that the current data transfer operation is complete, then in step 832, DMA engine 454 may preferably notify CPU 314 regarding the completion of the required data transfer operation, and the FIG. 8 process may then terminate. In accordance with the present invention, the FIG. 8 data transfer procedure via auxiliary channel 350 may readily occur concurrently with the foregoing FIG. 7 communication procedure via primary channel 346. The present invention thus provides an improved system and method for efficiently implementing an electronic device architecture.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for implementing an electronic architecture, comprising:
    a primary device that is configured to perform core operating functions in said electronic architecture, said core operating functions remaining unchanged after said electronic architecture is updated;
    an auxiliary device that is configured to perform selected additional operating functions in said electronic architecture, said selected additional operating functions being altered after said electronic architecture is updated;
    a primary channel configured for performing communications procedures between said primary device and said auxiliary device; and
    an auxiliary channel configured for performing data transfer operations between said primary device and said auxiliary device, said communications procedures over said primary channel and said data transfer operations over said auxiliary channel being able to occur in a concurrent manner.

2. The system of claim 1 wherein at least one of said primary device and said auxiliary device is implemented as an integrated circuit device.

3. The system of claim 1 wherein at least one of said primary device and said auxiliary device is implemented to include input/output interface functionalities for an electronic system.

4. The system of claim 1 wherein said core operating functions include predetermined functionalities that remain unchanged after said electronic architecture is updated.

5. The system of claim 1 wherein said selected additional operating functions include predetermined functionalities that change after said electronic architecture is updated.

6. The system of claim 1 wherein said electronic architecture includes a processor, said primary device, one or more primary peripheral devices, a memory, said auxiliary device, and one or more auxiliary peripheral devices, wherein said processor, said memory, and said one or more primary peripheral devices each communicate through said primary device, and wherein said one or more auxiliary peripheral devices each communicate through said auxiliary device.

7. The system of claim 1 wherein said primary device includes a CPU interface, one or more peripheral interfaces, a memory interface, a primary channel interface, an auxiliary channel interface, an arbiter, a direct memory access engine, and an internal primary device bus structure.

8. The system of claim 1 wherein an arbiter performs a primary channel arbitration procedure between a processor and one or more primary peripheral devices for controlling access to said primary channel, said primary channel having electrical connectors coupled to pins of said primary device and to pins of said auxiliary device, said electrical connectors being multiplexed to conserve said pins of said primary device and said pins of said auxiliary device.

9. The system of claim 1 wherein said data transfer operations between said primary device and said auxiliary device over said auxiliary channel are initiated by a processor coupled to said primary device, and then are performed by a direct memory access engine coupled to said primary device.

10. The system of claim 1 wherein said auxiliary device includes a primary channel interface, an auxiliary channel interface, one or more auxiliary configuration registers, one or more auxiliary peripheral interfaces, and an internal auxiliary device bus structure.

11. The system of claim 1 wherein a processor coupled to said electronic architecture determines whether one of said communications procedures is required between said primary device and said auxiliary device.

12. The system of claim 11 wherein an arbiter coupled to said primary device performs an arbitration procedure for several entities in said electronic architecture to thereby grant control of said primary channel to said processor.

13. The system of claim 11 wherein said processor communicates with said auxiliary device through said primary device during said one of said communications procedures.

14. The system of claim 1 wherein a processor coupled to said electronic architecture determines whether one of said data transfer operations is required between a memory device and said auxiliary device, said processor responsively setting up a direct memory access engine that is coupled to said primary device.

15. The system of claim 14 wherein said processor instructs said direct memory access engine to initiate said one of said data transfer operations between said memory device and said auxiliary device through said primary device, said direct memory access engine responsively beginning and then controlling said one of said data transfer operations.

16. The system of claim 15 wherein said direct memory access engine determines that said data transfer operation is complete, said direct memory access engine responsively notifying said processor.

17. The system of claim 1 wherein an auxiliary direct memory access engine coupled to said auxiliary device determines that one of said data transfer operations is required between a memory device and said auxiliary device, said auxiliary direct memory access engine responsively setting up and controlling said one of said data transfer operations.

18. A system for implementing an electronic architecture, comprising:
  a primary device that is configured to perform core operating functions in said electronic architecture;
  an auxiliary device that is configured to perform selected additional operating functions in said electronic architecture;
  a primary channel configured for performing communications procedures between said primary device and said auxiliary device;
  an auxiliary channel configured for performing data transfer operations between said primary device and said auxiliary device, said communications procedures over said primary channel and said data transfer operations over said auxiliary channel being able to occur in a concurrent manner; and
  a processor coupled to said electronic architecture for determining whether an auxiliary configuration procedure is required to configure said auxiliary device in response to at least one of a powerup event and a dynamic operational event.

19. The system of claim 18 wherein an arbiter coupled to said primary device performs an arbitration procedure for several entities in said electronic architecture to thereby grant control of said primary channel to said processor.

20. The system of claim 18 wherein said processor programs auxiliary configuration registers coupled to said auxiliary device to setup said auxiliary device for performing one or more corresponding auxiliary procedures.

21. A method for implementing an electronic architecture, comprising:
  performing core operating functions in said electronic architecture by utilizing a primary device, said core operating functions remaining unchanged after said electronic architecture is updated;
  performing selected additional operating functions in said electronic architecture by utilizing an auxiliary device, said selected additional operating functions being altered after said electronic architecture is updated;
  performing communications procedures between said primary device and said auxiliary device by utilizing a primary channel; and
  performing data transfer operations between said primary device and said auxiliary device by utilizing an auxiliary channel, said communications procedures over said primary channel and said data transfer operations over said auxiliary channel being able to occur in a concurrent manner.

22. The method of claim 21 wherein at least one of said primary device and said auxiliary device is implemented as an integrated circuit device.

23. The method of claim 21 wherein at least one of said primary device and said auxiliary device is implemented to include input/output interface functionalities for an electronic system.

24. The method of claim 21 wherein said core operating functions include predetermined functionalities that remain unchanged after said electronic architecture is updated.

25. The method of claim 21 wherein said selected additional operating functions include predetermined functionalities that change after said electronic architecture is updated.

26. The method of claim 21 wherein said electronic architecture includes a processor, said primary device, one or more primary peripheral devices, a memory, said auxiliary device, and one or more auxiliary peripheral devices, wherein said processor, said memory, and said one or more primary peripheral devices each communicate through said primary device, and wherein said one or more auxiliary peripheral devices each communicate through said auxiliary device.

27. The method of claim 21 wherein said primary device includes a CPU interface, one or more peripheral interfaces, a memory interface, a primary channel interface, an auxiliary channel interface, an arbiter, a direct memory access engine, and an internal primary device bus structure.

28. The method of claim 21 wherein an arbiter performs a primary channel arbitration procedure between a processor and one or more primary peripheral devices for controlling access to said primary channel, said primary channel having electrical connectors coupled to pins of said primary device and to pins of said auxiliary device, said electrical connectors being multiplexed to conserve said pins of said primary device and said pins of said auxiliary device.

29. The method of claim 21 wherein said data transfer operations between said primary device and said auxiliary device over said auxiliary channel are initiated by a processor coupled to said primary device, and then are performed by a direct memory access engine coupled to said primary device.

30. The method of claim 21 wherein said auxiliary device includes a primary channel interface, an auxiliary channel interface, one or more auxiliary configuration registers, one or more auxiliary peripheral interfaces, and an internal auxiliary device bus structure.

31. The method of claim 21 wherein a processor coupled to said electronic architecture determines whether one of said communications procedures is required between said primary device and said auxiliary device.

32. The method of claim 31 wherein an arbiter coupled to said primary device performs an arbitration procedure for several entities in said electronic architecture to thereby grant control of said primary channel to said processor.

33. The method of claim 31 wherein said processor communicates with said auxiliary device through said primary device during said one of said communications procedures.

34. The method of claim 21 wherein a processor coupled to said electronic architecture determines whether one of said data transfer operations is required between a memory device and said auxiliary device, said processor responsively setting up a direct memory access engine that is coupled to said primary device.

35. The method of claim 34 wherein said processor instructs said direct memory access engine to initiate said one of said data transfer operations between said memory device and said auxiliary device through said primary device, said direct memory access engine responsively beginning and then controlling said one of said data transfer operations.

36. The method of claim 35 wherein said direct memory access engine determines that said data transfer operation is complete, said direct memory access engine responsively notifying said processor.

37. The method of claim 21 wherein an auxiliary direct memory access engine coupled to said auxiliary device determines that one of said data transfer operations is required between a memory device and said auxiliary device, said auxiliary direct memory access engine responsively setting up and controlling said one of said data transfer operations.

38. A method for implementing an electronic architecture, comprising:

performing core operating functions in said electronic architecture by utilizing a primary device;

performing selected additional operating functions in said electronic architecture by utilizing an auxiliary device;

performing communications procedures between said primary device and said auxiliary device by utilizing a primary channel;

performing data transfer operations between said primary device and said auxiliary device by utilizing an auxiliary channel, said communications procedures over said primary channel and said data transfer operations over said auxiliary channel being able to occur in a concurrent manner; and utilizing a processor coupled to said electronic architecture to determine whether an auxiliary configuration procedure is required to configure said auxiliary device in response to at least one of a powerup event and a dynamic operational event.

39. The method of claim 38 wherein an arbiter coupled to said primary device performs an arbitration procedure for several entities in said electronic architecture to thereby grant control of said primary channel to said processor.

40. The method of claim 38 wherein said processor programs auxiliary configuration registers coupled to said auxiliary device to setup said auxiliary device for performing one or more corresponding auxiliary procedures.

41. A method for implementing an electronic architecture, comprising:

performing core operating functions in said electronic architecture by utilizing a primary device;

performing selected additional operating functions in said electronic architecture by utilizing an auxiliary device;

performing communications procedures between said primary device and said auxiliary device by utilizing a primary channel;

performing data transfer operations between said primary device and said auxiliary device by utilizing an auxiliary channel, said communications procedures over said primary channel and said data transfer operations over said auxiliary channel being able to occur in a concurrent manner; and initiating communications procedures and said data transfer operations by utilizing a central processing unit in response to one of a notification event from said auxiliary device and a polling event from said central processing unit to said auxiliary device.

42. A system for implementing an electronic architecture, comprising:

means for performing core operating functions in said electronic architecture;

means for performing selected additional operating functions in said electronic architecture;

means for performing communications procedures between said means for performing core operating functions and said means for performing selected additional operating functions; and means for performing data transfer operations between said means for performing core operating functions and said means for performing selected additional operating functions, said communications procedures and said data transfer operations being able to occur in a concurrent manner.

* * * * *